United States Patent [19]

Alaniz et al.

[11] 4,167,065
[45] Sep. 11, 1979

[54] PIPE MEASURING DEVICE

[76] Inventors: Matt Alaniz; George Spector, both of 3615 Woolworth Bldg., 233 Broadway, New York, N.Y. 10007

[21] Appl. No.: 887,876

[22] Filed: Mar. 17, 1978

[51] Int. Cl.² ............................................. G01B 3/10
[52] U.S. Cl. ..................................... 33/137 R; 33/138
[58] Field of Search ............................. 33/137 R, 138

[56] References Cited

U.S. PATENT DOCUMENTS 4,033,041  7/1977  Allums ................................... 33/138

Primary Examiner—Steven L. Stephan

[57] ABSTRACT

A device for measuring an oil well drill pipe in a relatively clean manner; the device including a foot unit for engaging a lower end of the pipe and a head unit for engaging the upper end of the pipe, and a steel measuring tape extending therebetween.

3 Claims, 6 Drawing Figures

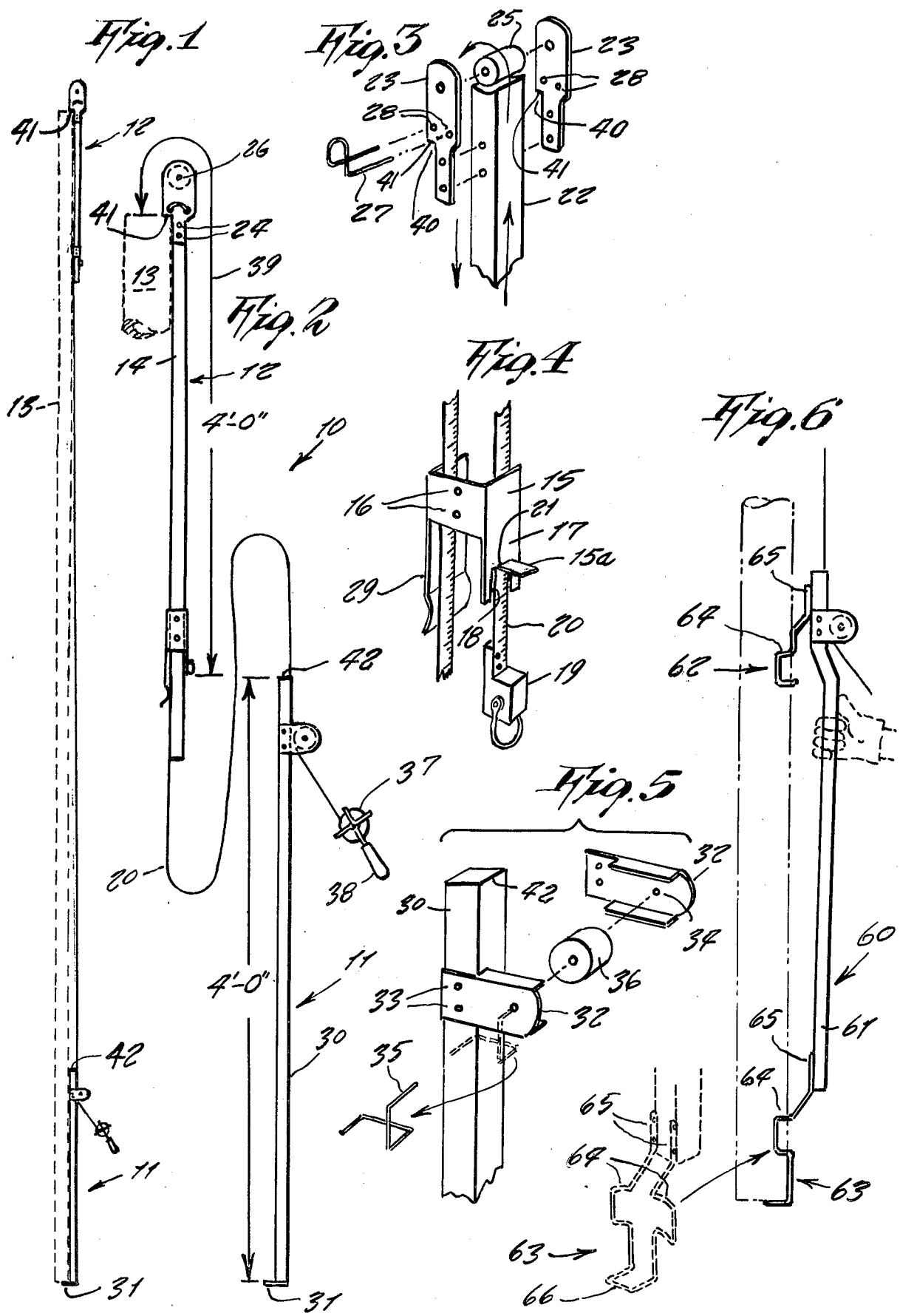

PIPE MEASURING DEVICE

This invention relates generally to oil drilling equipment accessories.

It is generally well known to those skilled in the field of oil well drilling that when the drill pipes are raised from the drill hole, they carry a large amount of sludge so that measuring the pipes becomes a grimy task.

This situation is objectionable and is therefore in want of an improvement.

Accordingly, it is a principal object of the present invention to provide a pipe measuring device that overcomes this situation by maintaining a steel measuring tape spaced from a main accumulation of sludge while measuring the pipe.

Another object is to provide a pipe measuring device in which the measurement is taken more closely to an eye level of a workman instead at a lower end thereof which would require a workman to bend down and also take measurement where the sludge is heaviest built up.

Still another object is to provide a pipe measuring device which promotes greater accuracy in measurements and is quick and readily handy.

Other objects are to provide a pipe measuring device which is simple in design, inexpensive to manufacture, rugged in construction, easy to use and efficient in operation.

These and other objects will be readily evident upon a study of the following specification and the accompanying drawing wherein:

FIG. 1 is a side view of the present invention shown measuring a pipe shown in dotted lines.

FIG. 2 shows the upper and lower units enlarged for a more clear detail thereof.

FIGS. 3, 4 and 5 are enlarged perspective views of various assemblies mounted on the upper and lower units.

FIG. 6 is a side view of a modified design of the lower unit, and which is constructed so to prevent oil getting on the tape and operators hands; the unit accordingly having a main bar spaced away from the oil well pipe by means of an upper and lower foot of stiff wire so that a minimum oil sludge clings thereto and which can be readily dislodged therefrom by just giving the unit a sharp rap against any object.

Referring now to the drawing in greater detail, and more particularly to FIGS. 1 to 5 at the present time, the reference numeral 10 represents a pipe measuring device according to the present invention which comprises a foot unit 11 and a head unit 12; the foot unit being placed around a lower end of a pipe 13 that is intended to be measured, and the head unit is fitted over an upper end of the pipe.

The head unit 12 includes a bar member 14 to a lower end of which a channel shaped bracket 15 is secured by means of rivets 16. A downward tongue 17 on one side of the bracket 15 is forked due to a notch 18 into which is fitted a block 19 secured to a "zero" end of a steel measuring tape 20, so to define a "zero" reading along a bottom edge 21 of the notch. A tab 15a, formed by the notch 18, is bent outwardly at a 90 degree angle, so to give support to the tape block 19.

The upper end of the bar is secured to a channel member 22 having upward projecting side plates 23 secured thereto by means of rivets 24. A roller 25 between the upper ends of the plates 23 is supported rotatably free on a pin 26 secured by the plates.

A U-shaped wire member 27 is inserted through openings 28 of the plates. It is to be noted that after the measuring tape is passed around the roller 25 on top, it is then first positioned flat against a side of the bar 14 so that when the wire member 27 is then inserted in the openings 28, the wire members holds the tape against the bar side.

The tape 20 is extended upwardly from the "zero" line 21, behind the tongue 15 and then upwardly over the roller 25, the tape therefrom extending downward behind a downward tongue 29. Therefrom the tape then extends downwardly to the foot unit 11.

Foot unit 11 includes a bar 30 that is exactly four feet long. A plate 31 secured under a lower end thereof projects sidewardly so that a lower end of the pipe can be fitted thereupon.

Near an upper end of the bar 30, a pair of brackets 32 are secured, by means of rivets 33, the brackets extending sidewardly and including aligned openings 34 for receiving formed wire 35 on which a roller 36 is freely pivotable, the roller being positioned between the brackets.

The steel measuring tape 20 extends behind the roller, as shown in FIG. 2, and the remaining end of the tape is would up on a reel 37 fitted with carrying handle 38.

In use of the present invention, the sidewardly extending heel of plate 31 is fitted under the lower end of the pipe, so the foot unit 11 is alongside the lower end of the pipe. The head unit 12 is placed on top of the pipe so that the upper edge of the pipe fits in notch 40 of side plates 23 and abuts against an edge 41 thereof. As clearly shown in FIG. 2, the length of the tape 12 from the starting or "zero" line 21, to a position over the roller 25 and down to the edge 41 and to an upper end of the pipe 13 is exactly four feet, as indicated by dimension 39; this dimension being exactly the same as the height of bar 30, at whose upper edge 42 a reading can be taken on the tape so to measure the length of the pipe. It is apparent that the four foot dimension may be varied as desired.

Thus the pipe length can be measured without bringing the measuring tape to the lower end of the pipe.

In FIG. 6, another design of the invention shows a modified foot unit 60 which is shaped so that only a very minimum thereof engages the pipe in order to not become grimy with sludge.

In this design, a bar 61 is kept spaced away from the pipe by means of an upper leg 62 and a lower leg 83 both of which are made of a stiff, relatively thin wire so that only a minimum amount of sludge can cling thereto. Each wire includes arcuate portions 64 for resting against a side of the pipe and parallel ends 65 welded to the bar. The lower leg 63 additionally includes sidewardly extending lower portion 66 for fitting under a lower end of the pipe 13. The bar has the above-described brackets 32 and roller 36.

In operative use, the foot member 60 is grasped in the hand by the bar 61, as shown so that no sludge gets on the hand. Any sludge that gets on the leg members 62 and 63 can be quickly shaken off by a sharp rap of the unit against any stationery object.

Thus a novel pipe measuring device is provided.

While various changes may be made in the detail construction, it is understood that such changes will be within the spirit and scope of the present invention as is defined by the appended claims.

What is claimed is:

1. A pipe measuring device, comprising in combination, a foot unit and a head unit for fitting on lower and upper ends of a pipe that is intended to be measured, said head unit comprising an elongated bar member having a lower portion to which the zero end of a steel measuring tape is secured, said tape extending along one side around an upper end of said member and downward therefrom on an opposite side, including a U-shaped cross pin mounted on said member extending transversely across said tape to hold the tape in place against the member, said member including means for engaging the upper end of a pipe, said steel measuring tape extending downward therefrom to said foot unit, and past an upper edge of said foot unit, said foot unit including a bar with a roller mounted thereon spaced from said bar, said tape fitting behind said roller including a terminal lower end of said steel tape having a tape reel attached thereto said foot unit having a sideward projection at a lower end thereof for fitting under a lower end of said pipe, said lower portion of the head unit including a spacer between the tape and pipe.

2. The combination as set forth in claim 1, wherein a distance from a starting end of said tape extending around an upper end of said head member and to said cross pin to equal to a distance from said upper edge of said foot unit to said sideward projection at a lower end thereof, wherein said lower portion of the head unit includes a tab adapted to engage the zero end of said tape.

3. The combination as set forth in claim 2, wherein said foot unit includes an upper and lower legs made of stiff wire which extend from said bar for engaging said pipe so as to space said bar therefrom, providing space for the users hand to encircle said bar without contacting said pipe, wherein said upper unit bar member includes a roller mounted on the upper end thereof to support the tape.

* * * * *